United States Patent [19]

Scott et al.

[11] Patent Number: 4,959,783
[45] Date of Patent: Sep. 25, 1990

[54] SYSTEM AND METHOD FOR CHOOSING RANDOM NUMBERS AND DELIVERING SUCH NUMBERS TO SUBSCRIBERS FOR PLAYING GAMES OF CHANCE

[75] Inventors: James Scott, Sunrise; Dennis Mosley, Pembroke Pines, both of Fla.

[73] Assignee: Lotto Pick Quick Winning Odds, Ltd., Ft. Lauderdale, Fla.

[21] Appl. No.: 334,168

[22] Filed: Apr. 6, 1989

[51] Int. Cl.5 ............................................. G06F 15/28
[52] U.S. Cl. ..................................... 364/412; 379/77; 379/97
[58] Field of Search .................... 379/97, 77, 88, 207; 279/138 A; 364/410, 412; 381/51

[56] References Cited

U.S. PATENT DOCUMENTS

| | | | |
|---|---|---|---|
| 4,323,770 | 4/1982 | Dieulot et al. | 364/412 X |
| 4,446,337 | 5/1984 | Cofer | 379/213 X |
| 4,649,563 | 3/1987 | Riskin | 379/97 |
| 4,665,502 | 5/1987 | Kreisner | 364/412 X |
| 4,689,742 | 8/1987 | Troy et al. | 273/138 A X |
| 4,692,863 | 9/1987 | Moosz | 273/138 A X |
| 4,700,322 | 10/1987 | Bentassat et al. | 364/513.5 |
| 4,815,741 | 3/1989 | Small | 273/138 A |
| 4,842,278 | 6/1989 | Markowicz | 364/412 X |
| 4,845,739 | 7/1989 | Katz | 379/92 |

Primary Examiner—Jerry Smith
Assistant Examiner—St. Kibby
Attorney, Agent, or Firm—Malloy, Downey & Malloy

[57] ABSTRACT

A system and method of practicing such system involving the random selection of numbers used in a lottery type game wherein such random number picks are delivered using conventional local and long distance telephone facilities to callers/subscribers through the provision of a central computer/processing unit and a plurality of interactive voice response assemblies audibly delivering such random number picks to the caller/subscriber.

11 Claims, 1 Drawing Sheet

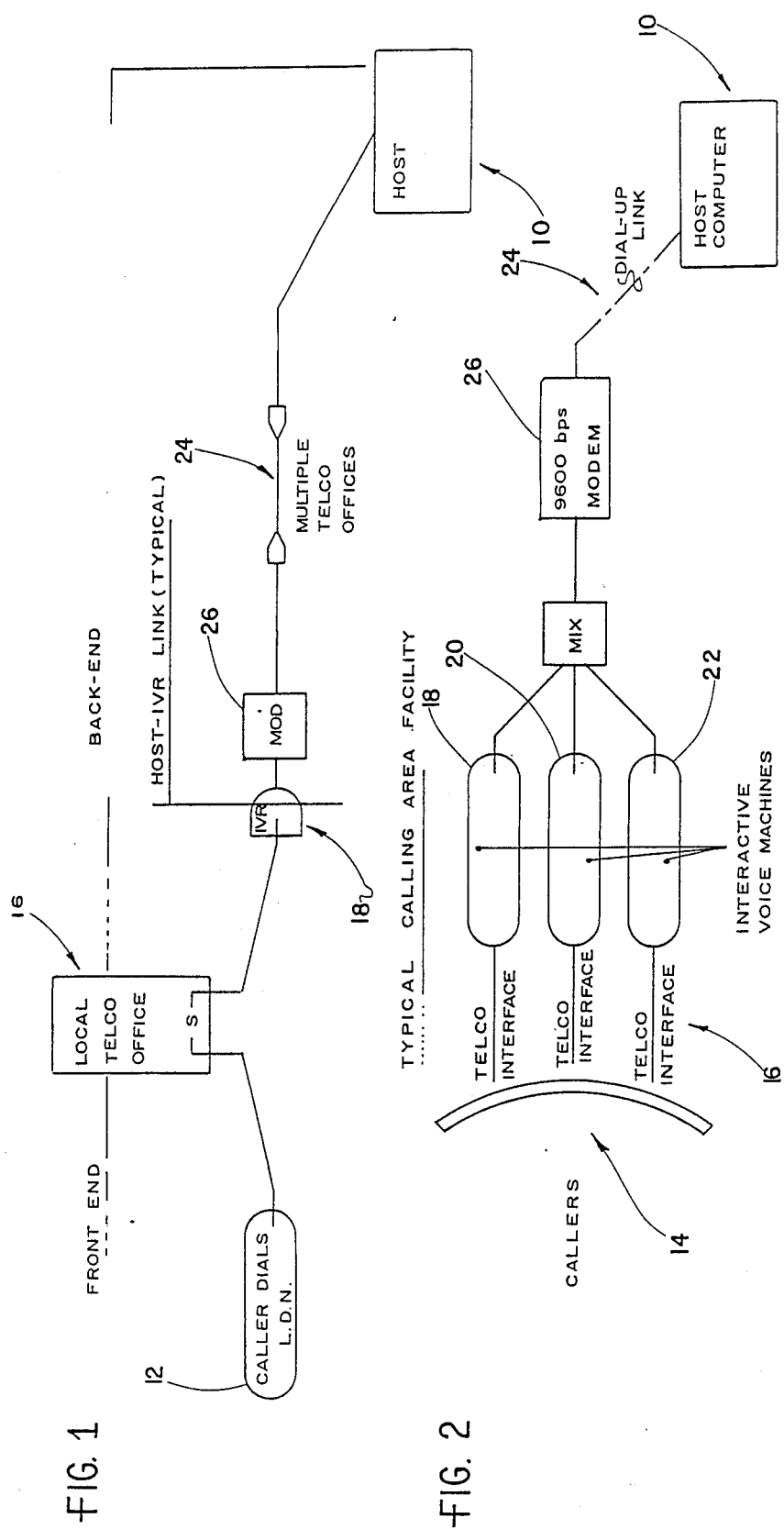

SYSTEM AND METHOD FOR CHOOSING RANDOM NUMBERS AND DELIVERING SUCH NUMBERS TO SUBSCRIBERS FOR PLAYING GAMES OF CHANCE

BACKGROUND OF THE INVENTION

1. Field of the Invention

This invention relates to both a system and method of generating randomly selective multi-digit numbers and delivering such numbers to subscribers for use in playing a lotto-type game of chance.

2. Description of the Prior Art

Lottery type games sponsored by governmental agencies have enjoyed increased popularity in recent years. Typically, such lotto-games are run by State Government and operated on a State-wide basis primarily for the purpose of raising revenue without taxation for purposes such as education, road works, etc. Players of such lotto games select a multi-digit number, typically a group of six numbers, from a large number of possible number-pick combinations Once a given number pick is chosen, the customer or player pays to have his number pick entered in a computer facility during a given play period for the next drawing of a winning lotto number. For example, a normal play period lasts one week and the lotto drawing involves the random selection of a multi-digit number which is designated as the winning number pick. The customer or customers choosing the winning number pick or possibly a lesser number of correct digits of the winning number (5 out of 6, 4 out of 6, etc.) wins a percentage of the indicated purse for a given play period.

Many customers or players choose their number pick utilizing a variety of different methods. Many such potential customers are seeking other "automatic" means to derive a given pick.

The prior art includes mechanical and electronic or basically computerized apparatus for the choice of multi-digit randomly selected number picks as evidenced by U.S. Pat. No. 4,692,863 and other similar devices. The above noted patent clearly indicates that processors, registers, computers, etc., can be easily developed for the random selection of multi-digit numbers wherein the range of numbers are picked from all possible combinations of a preselected number of numerals (from 1 to 49, for example).

The State of Florida has recently authorized the state-wide playing and governmental sponsoring of a lotto-type game of chance wherein players attempt to choose a wining six digit number from all the possible combinations (approximately 14 million such combinations) of the numerals from 1 to 49. A player is charged a fee for five groups of six number picks. Also, "lotto cards" are distributed to the public free of charge for the choosing of at least one but as many as five such number picks wherein such lotto cards are structured to be entered into a number processing unit for storage in a central computer system also maintained by the state. A given play period lasts one week and all monies derived from the purchase of number picks during that given week are distributed in part to the winning player choosing the correct number pick selected randomly by representatives of the state.

Even with the existence of mechanical devices and electronic equipment for the selection of random number picks, there is still a recognized need in this area to aid players in the selection of one or more number picks wherein such numbers can be utilized as a chosen number pick by a given player or players. Such a preferred system should be centralized to the extent that a player at any location throughout the state may have benefit of use of a common system and further wherein the system and/or method of practicing such system should be regulated to prevent the distribution of duplicate number picks.

SUMMARY OF THE INVENTION

The present invention relates to a system and method of practicing such system for the generation and transmission of randomly selected numbers to players (caller/subscriber) for use in a lottery-type game of chance wherein the random number picks are transmitted audibly to a caller/subscriber utilizing conventional local and/or long distance telephone facilities.

A caller/subscriber, defined by members of the general public, will be utilizing the system through the operation of conventional telephone equipment and facilities. Typically, a caller/subscriber will call or enter the subject system via an interactive service number such as 976 or 1-900 through local telephone operating companies. This will establish a communicating (call-in) link between the caller/subscriber and one of a plurality of processing means. A plurality of such processing means can be located throughout a given geographical area, such as throughout a state. In addition, such processing means are located such that non-residents of a given state or occupants of a given geographical area may also enter the system for purposes of obtaining multi-digit random number picks The processing means includes an interactive voice response system to facilitate human interaction with a computer via a telephone link. Such machines however are specifically structured to contain facilities including a custom designed instruction set or "program" which enables automatic entry into the subject system and continuance of the subject method to the extent that the caller subscriber merely dials the initial entry number (976 interactive service or the like). Each of the above noted plurality of processing means may be of the type commercially known as IVEC manufactured by American Communication and Engineering Inc., but it is to be emphasized that the scope of the present invention is not limited to this specific commercially available component. Further, modification to such a machine is required before such a machine adequately defines the processing means in terms of the intended scope of practice of the present invention. Other features associated with the invention is the ability to have the caller/subscriber once entered into the system determine which of a plurality of games he wishes to play. Such can be done by manipulation of the push-buttons of the TOUCHTONE system of this conventional telephone.

The processing means is particularly modified and programmed to permit additional action such as touchtone signalling by the caller/subscriber once they have dialed the entry number on their telephone unit. In addition, once this initial entry connection is made the processing means generically defining the interactive voice response assembly will complete the call in an uninterrupted manner. At this point, the processing means will be further structured and programmed to communicate on a processor to processor basis with a host computer means located centrally through an applicable modem structure. Such a modem structure can be of the V32 modem type manufactured by Multi-Tech.

The host computer through selective and specialized programming selects random groups of number picks from all the possible combinations within a selected numeral range (such as 1 to 49). Further, the host computer is connected by the conventional local or long distance telephone facilities to each of the plurality of processing means including the interactive voice assembly structure associated therewith. Once determined, the random number picks are transmitted to the processing means for distribution to a caller/subscriber in an audible mode. It is also important to note that the structure and specialized programming of the host computer is such as to prevent any distribution of duplicate random groups of number picks within a given play period (typically a one week period of time). Accordingly, once a particular random group of number picks has been transmitted from the host computer to any one of the interactive response assemblies, it will never again be generated during the current play period. As set forth above, this results in a guaranteed non-duplicate pick for each and every caller/subscriber. The host computer referred to herein may be of the type commercially available as PS2-Model 70 manufactured and distributed by IBM.

An example of a "play period" may constantly remain from any Saturday evening immediately after the "drawing" of the winning number pick to the following Saturday at the time of the next succeeding "drawing". These drawings may very well be performed on a regular weekly basis. It should of course be obvious that other lengths of time may be utilized as a given "play period". It is also assumed by the host computer that a given caller/subscriber will play the generated and transmitted number in a "current" play period which is in effect at the time of the call or entry into the subject system. The subject system and method of application thereof does not imply that non-duplication of picks will be carried over into a next succeeding play period which is not in effect at the time of a given call or request.

Other important features of the present invention is the inclusion in the processing means and/or interactive voice response assembly of a voice synthesizer unit capable of delivering the random group of number picks, after selection by the host computer. Accordingly, upon a caller/subscriber entering the system by reaching the processing means the selected number or numbers will be transmitted or communicated to the caller/subscriber "verbally". Also, the voice synthesizers can be further modified to selectively deliver such random groups of number picks in any of a preselected number of foreign languages.

The invention accordingly comprises the features of construction, combination of elements and various steps set forth in the included method which will be more apparent hereinafter especially taken in light of the accompanying drawings

BRIEF DESCRIPTION OF THE DRAWINGS

For a fuller understanding of the nature of the present invention, reference is made to the following detailed description taken in connection with the accompanying drawings in which:

FIG. 1 is a schematic representation of a caller/subscriber entering the system.

FIG. 2 is a schematic representation of a plurality of callers, representing various locations throughout a given geographical area concurrently and/or independently entering the system of the present invention.

Like reference numerals refer to like parts throughout the several views of the drawings.

DETAILED DESCRIPTION OF THE PREFERRED EMBODIMENT

As shown in both FIGS. 1 and 2, the subject invention comprises a system incorporating a host computer generally indicated as 10 which is preferably centrally located and has both sufficient memory and/or processing capability and which is specifically programmed to generate unique random groups of number picks from a given numeral range (typically 1 to 49) The opposite or front end of the system is represented by one or more callers 12 and/or concurrently a plurality of such callers generally indicated as 14 each of which may call from a plurality of locations throughout a plurality of given geographical areas Such communication between a caller/subscriber and the host computer is accomplished utilizing conventional local and/or long distance facilities generally indicated as 16.

Any one of the callers as at 14 may enter the system by calling listed directory numbers or alternately the typical "976 type line". In addition, other similar conventional facilities representing a national coverage such as 1-800 or 1-900 type phone service can be utilized. Entering the system through dialing the appropriate listed number establishes communication with each of the callers 12 or 14 with one of a plurality of processing means 18, 20 and 22. Such processing means may be situated "locally" within a given geographical area and the calling of a given number to enter the subject system establishes communication between a given caller or callers 14 and a given processing means 18, 20 or 22.

Each processing means includes an interactive voice response assembly having incorporated as part thereof a voice synthesizer unit. Each of the interactive voice response assemblies are specifically structured and modified to establish a direct connection, again typically using long distance telephone lines as at 24 and appropriate modem facilities 26 with the host computer 10. As set forth above, the interactive voice response assemblies of each of the processing means 18 through 22 are modified to establish the link directly to the host computer for purposes of receiving a pre-generated random group of number picks. Additional action, such as touch-tone signalling, by any one of the callers 12 or 14, may be required. Such additional signalling may be required for reasons of receiving the verbage in a specific language other than English or alternately to play one of a plurality of lottery type games of chance when more than one game is available. Once the communication link is established between the processing means 18, 20, 22 and the host computer 10, a preselected plurality of random groups of number picks are generated to a selected processing means 18, 20 or 22. The actual quantity of random picks generated may of course be preselected but may typically be from 1 to 5 groups of such picks. These numbers are then transferred through appropriate activation of the respective and associated voice synthesizer means through the local telephone lines 16 to the individual callers 12, 14. As set forth above, it should be recognized that the voice synthesizer structure associated with the processing means could be modified to deliver, selectively, the random group of number picks in any preselected language.

Another modification of the system and/or method of the present invention includes the processing means 18, 20, 22, etc., further comprising memory capability or storage facility for the storage of random groups of number picks previously generated from the host computer 10 over the same long distance telephone lines 24 to respective ones of the processing means 18, 20, 22 and/or interactive voice response assemblies associated therewith. The storage of a preselected number of such random picks may be maintained until a given or preselected number of callers establish communication with a given processing means 18, 20 or 22 until such stored random number picks are depleted.

Assurance of non-duplication of random groups of number picks generated may occur by the aforementioned specialized structuring and/or programming of the host computer 10. Such non-duplication is guaranteed within a given play period which may vary in length and be preselected also through modification of the programming of the host computer 10. It should further be noted that there are occasions whereby the host computer 10 communicates with one of a plurality of the processing means 18 for purposes related to administrative tasks not involving a specific caller 12 or 14. These tasks may include but are not limited to polling for call statistics, updating of data files, etc.

Now that the invention has been described,
What is claimed is:

1. A system used in combination with local and long distance telephone facilities designed to provide randomly selected groups of numbers to callers/subscribers for playing LOTTO type games of choice, said system comprising:
   a. computer means located centrally and specifically programmed for generating multi-digit random groups of number picks.
   b. a plurality of processing means interconnected to said computer means by the conventional telephone facilities for processor to processor communication therewith,
   c. at least one of said processing means connected by a call-in link defined by local telephone facilities to a caller/subscriber communicating with said processing means from a telephone unit,
   d. said one processing means comprising an interactive voice response assembly structured to transmit and receive data to and from said computer means,
   e. said interactive voice response assembly including voice synthesizer means structured for delivery of the random group of number picks in an audio mode to the caller/subscriber over the call-in link, and
   f. said computer means structured to generate and transmit to at least a preselected one of said interactive voice response assemblies a plurality of random number picks for storage at said interactive voice response assembly prior to contact therewith by a caller/subscriber.

2. A system as in claim 1 wherein said computer means is structured and specifically programmed to provide non-duplicate number picks during a given play period defined by a pre-recognized length of time.

3. A system as in claim 2 wherein each random number pick comprises six numbers.

4. A system as in claim 3 wherein each of said random number picks are selected from the numerals 1 to 49.

5. A system as in claim 1 wherein said voice synthesizer means is structured to selectively deliver the random number picks in an audio mode including selectively different languages.

6. A system as in claim 1 wherein the plurality of said processing means are located at different locales throughout a predetermined geographic location.

7. A system as in claim 6 wherein each of said processing means comprises an interactive voice response assembly including a voice synthesizer means, at least some of which are structured for audibly communicating with callers/subscribers in a non-english language.

8. A system as in claim 1 wherein said preselected ones of said interactive voice response assemblies are structured to generate and audibly transmit a preselected number of random number picks to a caller/subscriber upon contact therewith through said telephone facilities.

9. A method of providing multiple digit random number picks to a caller/subscriber using conventional telephone facilities, said method comprising the steps of:
   a. dialing an indicated telephone number by a caller/subscriber using the conventional telephone facilities,
   b. establishing communication to one of a plurality of processing means and interconnecting the one processing means to a host computer using the conventional telephone facilities,
   c. generating at least one multi-digit random number pick within a preselected numerical range and transmitting the one random number pick to the one processing means,
   d. communicating the one random number pick to the caller/subscriber in an audible mode,
   e. generating a predetermined plurality of random number picks by said host computer and transmitting said predetermined plurality of random number picks to said one processing means, and
   f. storing said predetermined plurality of random number picks in said one processing means prior to establishing a call-in link with a caller/subscriber.

10. A method as in claim 9 further including generating each possible random number pick a maximum of one time in a play period of predetermined length.

11. A method as in claim 9 further comprising transmitting said predetermined plurality of random number picks to said caller/subscriber from storage of said one processing means.

* * * * *